April 5, 1960 W. SCHENK 2,931,829
PROCESS FOR THE PREPARATION OF CYCLIC DICARBOXYLIC ACIDS
Filed Jan. 15, 1957
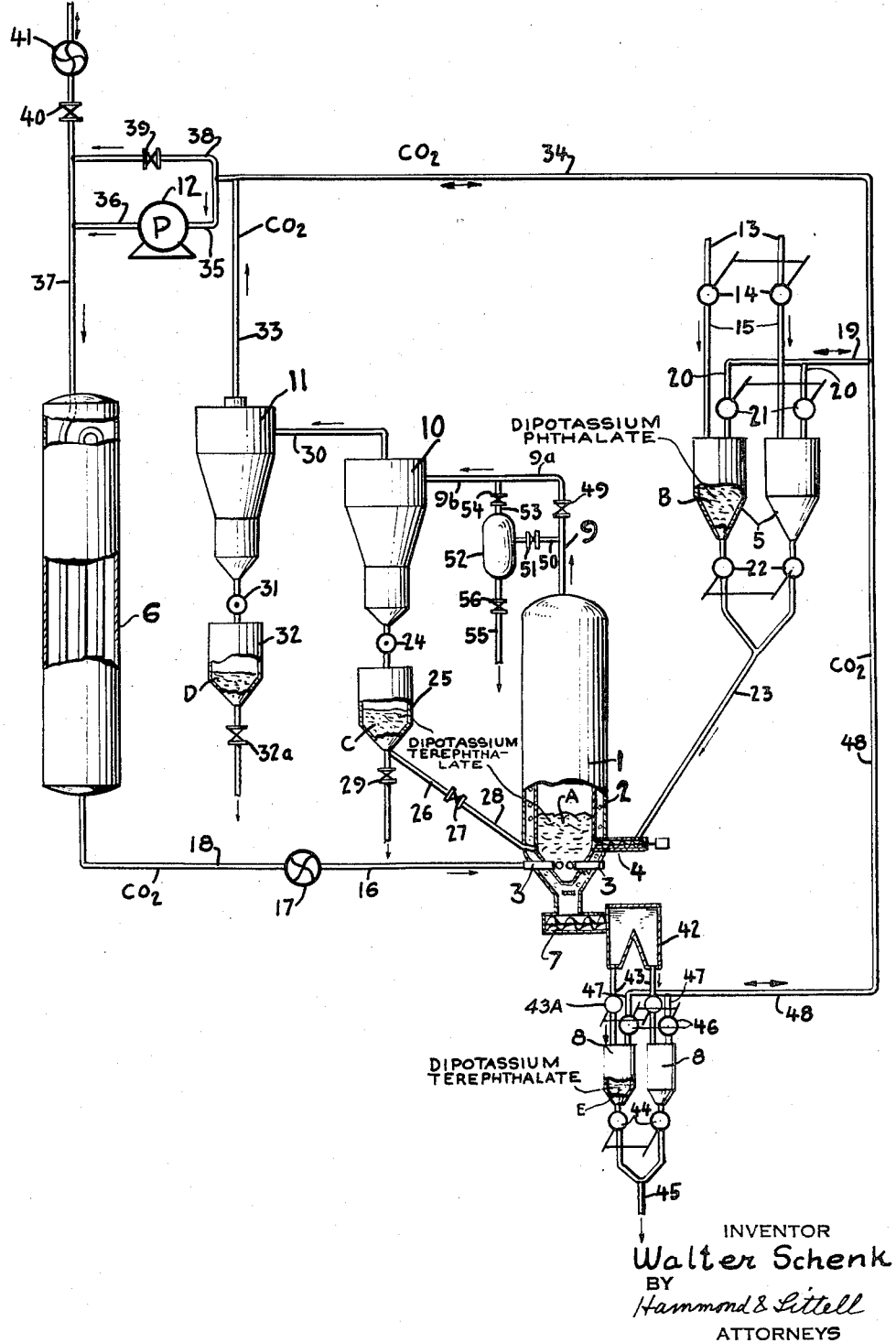
INVENTOR
Walter Schenk
BY
Hammond & Littell
ATTORNEYS 2,931,829

PROCESS FOR THE PREPARATION OF CYCLIC DICARBOXYLIC ACIDS

Walter Schenk, Heidelberg, Germany, assignor to Henkel & Cie. G.m.b.H., Dusseldorf-Holthausen, Germany, a corporation of Germany Application January 15, 1957, Serial No. 634,323

Claims priority, application Germany January 17, 1956

11 Claims. (Cl. 260—515)

This invention relates to a process carried out in a continuous manner for the rearrangement of cyclic carboxylic acids into other desired cyclic carboxylic acids of greater value. It more particularly relates to a process for the rearrangement of cyclic dicarboxylic acids in a fluidized solids type of reactor. The process is especially advantageous for the preparation of terephthalic acid by the rearrangement of phthalic, isophthalic or benzoic acids.

It is well known that certain cyclic dicarboxylic acids can be prepared by heating salts of other cyclic dicarboxylic acids or mono- or polycarboxylic acids at temperatures ranging between about 250° to 450° C. and liberating the carboxylic acids from the resulting rearrangement salts by acidification. For example, terephthalic acid can be prepared from benzoic, phthalic, or orthophthalic acid, in this way. In this rearrangement reaction the initial salts which are solids pass through a state of incipient fusion by the application of heat, preferably in the presence of carbon dioxide in which they become very sticky and tend to cake together and adhere to the walls of the reaction vessels. The reaction mixture again forms solid salts after the rearrangement has taken place, the terephthalate salts having a higher melting point than the phthalate, isophthalate or benzoate salts. The resulting solid salts of the dicarboxylic acids to be prepared are generally so compactly caked that a continuous movement from the reaction compartment to the apparatus used for the processing to release the dicarboxylic acids involves great difficulties. Such processes therefore have usually been carried out in autoclave reactors as batch operations.

It is an object of this invention to provide a process for the preparation of dicarboxylic acids which may be conducted in a continuous manner.

It is a further object of this invention to provide a process for the rearrangement of salts of cyclic dicarboxylic acids, whereby the product salts may be withdrawn continuously from the reactor.

Another object of this invention is to conduct a rearrangement of salts of cyclic dicarboxylic acids in a fluidized bed reactor in such a manner that the starting materials may be continuously added and the reaction products continuously withdrawn in the manner of fluidized solids.

These and other objects will become apparent as the description proceeds.

I have found that this rearrangement process can be carried out in a continuous manner without difficulty when the salt used as the starting material is heated in a fluidized bed of salts of the acid to be prepared, in the presence of catalysts if desired. The fluidized solids technique, although relatively new, has found wide application in chemical process industries. In this type of operation, the reactor contains a bed of finely divided solids maintained in suspension by the upward flow of a gas through the bed. The velocity of the gas is maintained at such a rate that the material does not move downward, nor is any great amount carried upward entrained in the stream of gases. In this state the bed of solids is maintained in a state of mild ebullition and assumes the nature and resembles a boiling liquid.

The finely divided solids bed may be composed of a catalyst material into which a vapor or gas is passed to be treated such as in the cracking or reforming of petroleum and its fractions. In other cases, the fluidized solids may serve only as a heat carrier for a thermal process such as in the fluid coking of residual oil. In other instances the fluidized solid may be the material which enters into the reaction itself and the fluidizing gas is the other reactant. An example of this type of process is in the roasting of ores, such as pyrrhotite, wherein oxygen is used as the fluidizing gas. The oxygen reacts under heat with the ores to form sulfur dioxide which is taken off overhead as a gas.

None of the prior art processes are suitable for my reaction since caking of the rearranged salts cannot be avoided with their use. However, by introducing the reactants into a fluidized bed of product salts having a higher melting point than the starting salts, the fine grain structure and low bulk density of the reaction material may be preserved by the process hereinafter described. The introduction of starting material and the removal of the salts of the acid to be prepared present no difficulties since the fluidized material is present in a liquid simulating state. The finely ground material flows readily to the reactor, and the product salts, obtained in a finely divided state by my process, likewise flow easily from the reactor to further processing.

The fluidizing of the reaction material is effected in the conventional manner by introducing gases into the fluidized bed. Carbon dioxide, alone or in admixture with nitrogen if desired, is especially suitable for this process. Other inert gases such as carbon monoxide, ethane, propane, benzene hydrocarbon gases and the like may be used. The gases are introduced into the bottom of the reactor through ducts spaced around its perimeter and extending into the bed. The gas may also be introduced into the bottom of the reactor through a single inlet and passed upward through a grid which supports the fluidized material. The amount and velocity of the gas required for the fluidizing depends on the grain size and bulk density of the material which makes up the fluidized bed. The fluidizing gas should be supplied at such a rate that no sedimentation of the heavier particles will take place even when the fluidized bed consists of particles of different specific gravity, for example when catalysts are present. The grain size of the product salt which make up the fluidized bed and the grain size of the starting salt to be introduced is advantageously 0.5 to 3 mm.

The bed may be heated by the gases employed for fluidizing by passing the gas through a heater prior to its entry to the reactor. It is often advantageous to surround the reaction vessel with an electrical heating unit particularly to compensate for heat loss by radiation. The rearrangement reaction may be conducted at atmospheric or elevated pressure generally in the presence of carbon dioxide or carbon dioxide gas containing mixtures.

Examples of cyclic dicarboxylic acids which may be prepared by this process are aromatic, cycloaliphatic and heterocyclic dicarboxylic acids containing one or more rings, such as terephthalic acid, naphthalene dicarboxylic acids, diphenyl-dicarboxylic acids, cyclohexane- or cyclopentane-dicarboxylic acids or pyridine dicarboxylic acids. These acids can also contain additional nuclear substituents, for example halogen atoms or alkyl groups. Furthermore, the term cyclic dicarboxylic acids comprises cyclic acids, which contain in place of the carboxyl group, another salt-forming acid group, such as the phenolic group. Examples of this kind of acid are 4-hydroxybenzoic and hydroxynaphthalene-carboxylic acids.

Suitable starting materials for the process are salts, particularly potassium or other alkali metal, or thallium-I, salts of mono- or polyvalent cyclic carboxylic acids such as benzoic, phthalic, isophthalic, hemimellitic, trimellitic, trimesic, mellophanic, prehnitic, pyromellitic and mellitic acids. Mixtures of salts of benzene carboxylic acids, such as mixtures of the sodium and potassium salts of phthalic, isophthalic or benzoic acid, may also be used. Salts of mixtures of benzene carboxylic acids such as those obtained for example by oxidation of dialkyl benzenes, particularly crude xylene with air or nitric acid may also be used. The mixtures obtained by oxidative decomposition of higher ring systems or by treatment of carbon-containing substances, such as graphite, anthracite, lignite, peat, wood, lignin, coal extracts, taras, pitches, coke or asphalts with sulfuric acid, are also suitable. Other possible starting acids are naphthalic acid, 2-hydroxy-1-naphthalene-carboxylic acid, salicyclic acid, diphenic acid, etc.

The preparation of the potassium or other alkali metal or thallium-I salts of the above acids may take place in the usual manner, for example in solvents by neutralizing the acids with the hydroxides or carbonates of potassium sodium or thallium, or by melting together the acid or its anhydride and hydroxides, carbonates or oxalates of potassium, thallium or the like. It is advisable for the finished salts not to contain any excess hydroxide or carbonate, but an excess of potassium or thallium carbonate is not disadvantageous in the subsequent heat treatment of the salts. Instead of the salt of the starting acid itself, mixtures of the acids or their anhydrides and potassium or thallium hydroxides or carbonates, from which the salts are then formed on subsequent heat treatment, may be used.

Instead of potassium or thallium salts alone, use can also be made of their mixtures with the corresponding sodium salts as starting materials. For example, salt mixtures containing 0.5–60% by weight sodium salts together with potassium or thallium salts are suitable. Mixed salts of the cyclic carboxylic acids used as starting materials, and which contain sodium and potassium or thallium, may be employed for the rearrangement. The salt mixture is advantageously prepared as described in copending United States application Serial Number 631,058, filed December 28, 1956.

Examples of catalysts suitable for use in my process are oxides, carbonates or halides of zinc, cadmium or bivalent iron. Organic salts of these metals, for example of the carboxylic acids serving as starting materials, are particularly good catalysts.

The temperatures required for the reaction generally lie between 250 and 450° C., advantageously between 350 and 450° C., and particularly between 400 and 440° C. However, lower temperatures are needed for rearranging the hydroxycarboxylic acids, so that with these acids temperatures of 250–350° C. are adequate. The upper temperature should be below the temperature at which substantial decomposition of the starting materials and reaction products takes place.

It has proven to be especially advantageous in the rearrangement of salts of cyclic carboxylic acids resulting from nitric acid oxidation, for example in the case of the oxidation products obtained from crude xylenes with nitric acid, to make supplementary use of small quantities of hydrides or carbides, particularly of potassium or sodium. In this way, the decomposition of the nitrogen-containing impurities, especially of the cyclic carboxylic acids containing nitro groups and obtained as by-products of the oxidation, is substantially reduced.

The heat treatment may be effected at atmospheric or elevated pressures up to 100 atmospheres and even higher. The pressures are obtained by introducing inert gases particularly carbon dioxide or nitrogen or mixtures of the two. The presence of oxygen and water during the heat treatment is undesirable since they reduce the yield of product.

The dicarboxylic acids to be prepared in this process are liberated from the product salts obtained in the fluidized bed heat treatment by treatment of the product salts with acids or acid salts. This is advantageously effected in accordance with the process of United States application Serial Number 626,607 filed December 6, 1956, by treating the salts obtained from the heat treatment in solution with an acid substance capable of liberating the dicarboxylic acids particularly carbon dioxide which is used advantageously under pressure, separating a portion of the liquid if desired from the resulting solids-liquid mixture, adding a solvent, if desired, to the remaining solids-liquid mixture, treating the mixture with a cyclic carboxylic acid whose salts were used as starting materials, separating the liberated dicarboxylic acids, combining the remaining liquid phase with the liquid previously separated from the solids-liquid mixture, evaporating the combined liquids and reusing the dry residue in the rearrangement process for the preparation of dicarboxylic acid.

Figure 1 illustrates a flow diagram in elevation showing the apparatus and arrangement suitable for performing my process.

In the drawing, reactor 1 is surrounded by electric heating jacket 2 and contains finely divided solids A which are salts of the dicarboxylic acid to be produced, shown as dipotassium terephthalate for illustration. During the operation of the process, these salts are maintained in a fluidized, liquid simulating bed by a gas such as carbon dioxide which enters through line 16 and ducts 3 which are spaced around the lower portion of the reactor and extend into the finely divided solids bed A. Ducts 3 may be replaced by a screen grid, not shown, in which case the carbon dioxide would enter through line 16 at a point below the grid and pass upwardly through the openings of the grid. The carbon dioxide is maintained at the proper pressure, velocity and temperature for the fluidization of the solids by passing it through pump 12, heater 6 and metering valve 17.

The starting material, for example, a dipotassium phthalate, is introduced into surge hoppers 5 through lines 13, control valves 14 and lines 15. Carbon dioxide is introduced into the surge hoppers from line 48 through line 19, lines 20 and valves 21. The particles B of the starting material flow from surge hoppers 5 which are controlled by valves 22 into line 23 and thence into screw conveyor 4 which conveys starting material into the fluidized solids reaction bed. The starting material is converted by the heat within the fluidized bed into the salts of the cyclic dicarboxylic acids to be produced and these salts are removed from the bottom of the reactor through screw conveyor 7 which empties the product salt into receiving hopper 42. From hopper 42 the finely divided product salts flow through lines 43 containing valves 43A into storage hoppers 8. These salts may be removed from hoppers 8 through the lines containing valves 44 and line 45 for further treatment in apparatus not shown to obtain the dicarboxylic acid. Carbon dioxide is removed from hoppers 8 through lines 47 containing valves 46 and line 48. The carbon dioxide is recycled through line 48 to line 19 as previously described and further through line 34 for reuse in the process in the fluidized reactor.

The major portion of the carbon dioxide fluidizing gases admitted through ducts 3 passes out of the top of reactor 1 through line 9 with a small amount of solids entrained therein. The carbon dioxide gas then passes through valve 49 and lines 9A and 9B into cyclone separator 10 where the entrained product salts are removed. These product salts settle to the bottom of cyclone separator 10 and may be removed through the line containing valve 24 into storage hopper 25. Letter "C" represents this product salt. From hopper 25 the product salts may be either removed through the line containing valve 29 or recycled to the fluidized bed in reactor 1 through line 26 and valve 27 and line 28.

The carbon dioxide gas which leaves reactor 1 through line 9 may be passed through separator 52 if it contains benzene which is the case when benzoic acid salts are used as the starting material from hoppers 5 instead of phthalic acid salts. In this case, valve 49 is closed and the carbon dioxide passes into the separator through valve 51 in line 50. Benzene is condensed and separated in separator 52 and may be removed through valve 56 in line 55. The carbon dioxide passes out of separator 52 through valve 54 in line 53 and thence through line 9B into cyclone separator 10 after which it proceeds in the same manner described below.

Carbon dioxide gas with product salts separated therefrom passes from cyclone separator 10 through line 30 into cyclone separator 11 wherein remaining carbonaceous solid materials are removed, which materials pass through the line containing valve 31 and are represented by bed D in storage hopper 32. These materials may be removed through the line containing valve 32A. The carbon dioxide gases now freed from all solid material pass out of cyclone separator 11 through line 33 which joins with the carbon dioxide recycle line 34. The carbon dioxide gas is recycled to reactor 1 through line 35, blower 12, line 36, line 37, heater 6, line 18, meter valve 17 and line 16. Since some carbon dioxide may be produced in the process it may be necessary to withdraw a certain amount of carbon dioxide from the system to maintain the pressure and velocity of the flow of carbon dioxide at the constant value. The excess carbon dioxide gas may be removed through line 38 by opening valves 39 and 40. The removal of carbon dioxide may be kept under constant control by meter valve 41. Carbon dioxide used in starting the operation or needed to make up losses may also be introduced through meter valve 41, and valves 40 and 39.

By the use of the apparatus diagrammatically illustrated and described, it is possible to charge the supply hoppers 5 and 25 and to discharge hoppers 8 at atmospheric pressure and then close the various valves 14, 24, 44 and so forth, and operate the system under superatmospheric pressure.

The following examples are offered to enable persons skilled in the art to understand and practice my invention and are not intended to be limitative in any respect.

*Example I*

Into pressure vessel 1, which is surrounded by an electrical heating unit, there is introduced 30 kg. dry dipotassium terephthalate having a grain size of 0.5 to 3 mm. Carbon dioxide is introduced through ducts 3 into the lower portion of the pressure vessel which is filled with dipotassium terephthalate. The blower 12 used for this purpose is adjusted in such a way that the pressure of the vessel 1 rises to 12 atmospheres and that 2,200 cu. meters carbon dioxide is introduced per hour. As soon as a uniform state of fluidization exists, well-dried dipotassium phthalate is slowly introduced from one of the vessels 5 with the aid of screw conveyor 4, this material having a grain size of 0.5 to 3 mm. and having 2% of a cadmium oxide catalyst mixed therewith. When the reaction system is in balance, 400 kg. dipotassium phthalate, with catalyst mixed therewith, is introduced hourly into the fluidized bed. The temperature in pressure vessel 1 is regulated to 410° C. by the carbon dioxide which has been preheated in gas heater 6 and which is introduced through ducts 3. The reaction product is transported through screw conveyor 7, through a receiving hopper, into vessels 8.

In the course of two hours, 800 kg. crude reaction product is obtained. It is dissolved in a stirring tank in 3.5 cu. meters water at 70° C. The undissolved catalyst and a small amount of carbonaceous residue is filtered off and washed with hot, aqueous phthalic acid solution. The residue is again treated with hot phthalic acid solution to recover any remaining catalyst.

Into the clear filtrate, which contains all of the dipotassium terephthalate and has been cooled to 5° C., carbon dioxide is introduced under a pressure of 6 atmospheres to the point of constant pressure. A solid comprising mainly potassium hydrogen terephthalate and free terephthalic acid precipitates, while most of the cadmium catalyst dissolves. The precipitate is separated with the aid of a rotary pressure filter and treated with 517 kg. aqueous phthalic acid solution in a pressure vessel equipped with stirrer at 130° C. in order to liberate any remaining terephthalic acid, the treatment being continued until a sample of filtrate no longer forms any precipitate of terephthalic acid on addition of mineral acid. The precipitated terephthalic acid is separated and thoroughly washed. After drying at 150° C., 498 kg. pure terephthalic acid is obtained.

The filtrate, consisting of potassium hydrogen phthalate and some free phthalic acid, is partly used for precipitation of terephthalic acid from the dipotassium salt solution and partly for the preparation of new starting material by neutralization with potassium bicarbonate solution and evaporation of dryness.

The filtrate solution remaining from the separation of terephthalic acid is mixed with the solution obtained in the aforementioned treatment of carbonaceous residue with phthalic acid solution and used for further reaction.

*Example II*

Reactor 1 is modified so that it differs from the one described in Example I only in that the carbon dioxide employed for fluidization is not introduced into the reaction compartment through ducts, but from below through a grid on which the fluidized material rests. Pressure vessel 1 is charged with 30 kg. dry dipotassium terephthalate and heated at 430° C. under a gas pressure of 9 atmospheres by introducing a hot mixture of nitrogen and carbon dioxide through the line 38. 300 kg. potassium benzoate and 135 kg. sodium benzoate containing 4% cadmium benzoate, based on the total alkali benzoate, is introduced hourly into the fluidized bed. The carbon dioxide-nitrogen mixture used for the fluidization is recycled in the process. The quantity circulated hourly amounts to 4,500 cu. meters.

A separator is incorporated in the cycling line for the carbon dioxide-nitrogen mixture for the purpose of separating the benzene formed during the process. As soon as benzene condenses in this separator, withdrawal of reaction product formed is begun through screw conveyor 7. The hourly yield of solid reaction product is 316 kg. and of benzene, 116.5 kg. The processing of the solid reaction product is as described in Example I. In this case benzoic acid is used for liberating the terephthalic acid from the acid salt. The yield of pure terephthalic acid is 214 kg./hr.

While I have set forth specific examples and preferred embodiments for the practice of my invention, it will be understood that various modifications may be made without departing from the spirit of my invention and the scope of the appended claims.

I claim:

1. A process for preparing terephthalic acid by heating, as a starting material, alkali metal salts of aromatic carboxylic acids selected from the group consisting of phthalic and benzoic acids wherein the salts are heated to a temperature of between about 400° C. and 440° C. and in the presence of an inert atmosphere and a cadmium-containing catalyst, whereby said salts undergo a rearrangement and are converted into the dialkali metal terephthalate and with liberation of the terephthalic acid from the dialkali metal terephthalate salts by adding acids, wherein said starting salts are heated in a fluidized bed consisting of dialkali terephthalate salts of the type obtained from the rearrangement reaction.

2. The process of claim 1 wherein the inert atmosphere is a gas selected from the group consisting of carbon dioxide, nitrogen and mixtures thereof.

3. A process for preparing alkali metal salts of symmetrical aromatic dicarboxylic acids selected from the group consisting of mono- and dicyclic aromatic dicarboxylic acids which comprises the steps of forming a fluidized bed of finely divided alkali metal salts of the symmetrical aromatic dicarboxylic acids to be formed by passing inert gas upwardly through said salts in a heated reactor, passing into said fluidized bed a starting material comprising a mixture of finely divided alkali metal salts of non-symmetrical aromatic dicarboxylic acids selected from the group consisting of mono- and dicyclic aromatic dicarboxylic acids and a cadmium-containing catalyst into said fluidized bed, said starting material salts and fluidized bed salts being of the same bulk density, withdrawing product salts which result from a rearrangement of the starting salts, withdrawing fluidizing gas from the top of said reactor, and recycling said gas to said reactor.

4. A process for preparing symmetrical aromatic dicarboxylic acids selected from the group consisting of mono- and dicyclic aromatic dicarboxylic acids which comprises the steps of forming a fluidized bed of finely divided alkali metal salts of the symmetrical aromatic carboxylic acid to be formed by passing an inert gas upwardly through said salts in a heated reactor, passing a starting material of finely divided alkali metal salts of non-symmetrical aromatic dicarboxylic acids selected from the group consisting of mono- and dicyclic aromatic dicarboxylic acids of the same bulk density as the fluidized bed salts, in admixture with a catalyst containing a metal selected from the group consisting of cadmium, zinc and bivalent iron, into said fluidized bed, withdrawing the product salts of symmetrical aromatic dicarboxylic acids which result from a rearrangement of the starting salts from a point near the bottom of the reactor, treating said rearranged salts with an acid to liberate the symmetrical aromatic dicarboxylic acid, withdrawing inert fluidizing gas containing entrained solids from the top of said reactor, passing said fluidizing gas through cyclone separators to separate said entrained solids, and recycling said gas to said reactor through a heater to provide a part of the heat required for the rearrangement reaction.

5. The process of claim 4 wherein the inert atmosphere is a gas selected from the group consisting of carbon dioxide, nitrogen and mixtures thereof.

6. The process of claim 4 wherein the particle size of the salts is 0.5–3 mm.

7. A process for preparing terephthalic acid which comprises the steps of forming a fluidized bed of finely divided dipotassium terephthalate salts by passing carbon dioxide gas upwardly through said salts in a heated reactor, passing a starting material of finely divided dipotassium orthophthalate salts of the same bulk density as said fluidized bed salts in admixture with a cadmium-containing catalyst into said fluidized bed, withdrawing the dipotassium terephthalate which results from a rearrangement of the starting salts from a point near the bottom of the reactor, treating said rearranged salts with an acid to liberate the terephthalic acid, withdrawing fluidizing gas containing entrained solids from the top of said reactor, passing said fluidizing gas through cyclone separators to separate said entrained solids, and recycling said gas to said reactor through a heater to provide a part of the heat required for the rearrangement reaction.

8. The process of claim 7, wherein the starting salts are salts of benzoic acid.

9. The process of claim 8, wherein benzene is separated from the recycled carbon dioxide prior to the reuse of said carbon dioxide in the reactor.

10. In a process for preparing symmetrical aromatic carboxylic acids selected from the group consisting of mono- and dicyclic aromatic carboxylic acids, said acids having the acid groups attached directly to the aromatic nucleus, wherein one of said acid groups is a carboxyl group and the other is selected from the group consisting of carboxyl and phenolic hydroxyl groups, by heating alkali metal salts of non-symmetrical aromatic carboxylic acids selected from the group consisting of mono- and dicyclic aromatic carboxylic acids having the acid groups attached directly to the aromatic nucleus, wherein one of said acid groups is a carboxyl group and the other is selected from the group consisting of carboxyl and phenolic hydroxyl groups, to a temperature of about 300° C. and below the temperature at which substantial decomposition takes place and in the presence of an inert gas and a catalyst containing a metal selected from the group consisting of zinc, cadmium and bivalent iron, whereby said starting salts are converted into the corresponding salt of the symmetrical aromatic carboxylic acid to be prepared, and subsequently liberating the free symmetrical aromatic carboxylic acid from the salt by acidification, the improvement which comprises heating the salts used as the starting material in a fluidized bed of alkali metal salts of the symmetrical aromatic carboxylic acid to be prepared.

11. A process for preparing symmetrical benzene dicarboxylic acids by heating a starting material comprising alkali metal salts of non-symmetrical carboxylic acids at a temperature between about 300° C. and the temperature at which substantial decomposition of the starting salt takes place and in the presence of an inert gas whereby the starting salt is converted into the corresponding salt of the symmetrical benzene carboxylic acid to be prepared, wherein the salts used as the starting material are heated in a fluidized bed consisting of alkali metal salts of the symmetrical benzene dicarboxylic acid to be prepared.

References Cited in the file of this patent

UNITED STATES PATENTS

| | | |
|---|---|---|
| 2,823,228 | Raecke et al. | Feb. 11, 1958 |
| 2,823,229 | Raecke | Feb. 11, 1958 |
| 2,823,231 | Raecke et al. | Feb. 11, 1958 |

FOREIGN PATENTS

| | | |
|---|---|---|
| 522,829 | Belgium | Oct. 15, 1953 |
| 524,035 | Belgium | Nov. 30, 1953 |

OTHER REFERENCES

Kalback: Chem. Engineering pages 105–108, January 1947.

Jr. of Chem. Ed. (Ad. Sec.), vol. 24, No. 6, page 306, June 1947.

Weissberger: Technique of Organic Chemistry, vol. II, 2nd edition, pages 39–41 (1956).